US012518798B1

(12) United States Patent
Gluckman et al.

(10) Patent No.: US 12,518,798 B1
(45) Date of Patent: Jan. 6, 2026

(54) CONTINUOUS VIDEO RECORDING, STORAGE, AND ON-DEMAND EVENT STREAMING

(71) Applicant: Amazon Technologies, Inc., Seattle, WA (US)

(72) Inventors: Jason Gluckman, Encinitas, CA (US); Oleksandr Cherevko, Irvine, CA (US); Nina Lebedko, Bromely (GB); Anton Nils Amlinger, Cambridge (GB); Wehbi Habli, Chelmsford (GB); Yevhen Ostapenko, Cambridge (GB); Richard William Lowe, Royston (GB); Syed Akhass Adnan Wasti, London (GB); Kseniia Vynnyk, Kyiv (UA)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 14 days.

(21) Appl. No.: 18/242,248

(22) Filed: Sep. 5, 2023

(51) Int. Cl.
  *G11B 27/34* (2006.01)
  *H04N 5/77* (2006.01)
(52) U.S. Cl.
  CPC .............. *G11B 27/34* (2013.01); *H04N 5/77* (2013.01)
(58) Field of Classification Search
  CPC .................................. G11B 27/34; H04N 5/77
  See application file for complete search history.

(56) References Cited

U.S. PATENT DOCUMENTS

| 11,922,697 | B1 | 3/2024 | Xu |
| 2019/0098337 | A1* | 3/2019 | Romm ................ H04N 19/105 |
| 2020/0143645 | A1 | 5/2020 | Laska et al. |
| 2020/0204759 | A1* | 6/2020 | Liu ........................ H04N 19/40 |

FOREIGN PATENT DOCUMENTS

JP        2007251646 A    *  9/2007

* cited by examiner

*Primary Examiner* — Girumsew Wendmagegn
(74) *Attorney, Agent, or Firm* — K&L Gates LLP

(57) ABSTRACT

Systems and techniques are described for continuous video recording and event streaming. In various examples, first video data may be received from a camera device. The first video data may be stored as a first plurality of video segments. A first plurality of micro-events associated with the first video data may be determined. Each micro-event of the first plurality of micro-events may be associated with a respective time stamp. In some examples, a first video event may be determined based at least in part on a first subset of the first plurality of micro-events. In some cases, at least a first video segment of the first plurality of video segments corresponding to the first video event may be determined. A video file representing the first video event may be generated using at least the first video segment.

26 Claims, 8 Drawing Sheets

CONTINUOUS VIDEO RECORDING, STORAGE, AND ON-DEMAND EVENT STREAMING

BACKGROUND

Security systems may use one or more cameras to capture video data of areas of interest. For example, video security cameras may be positioned so as to surveil an entryway into a secure area such as a bank vault or an entrance to a private residence. Security camera systems sometimes use motion detection to initiate video capture and/or video streaming to one or more other devices. For example, upon detection of motion in video data or by a motion sensor, a camera may be configured to capture and send a live feed of video from the camera to a cloud-based server system, a central computing device, and/or to a mobile application executing on a mobile phone. In other examples, upon detection of motion in video data, a camera may begin storing captured video data in a data storage repository.

DETAILED DESCRIPTION

Figure 1:
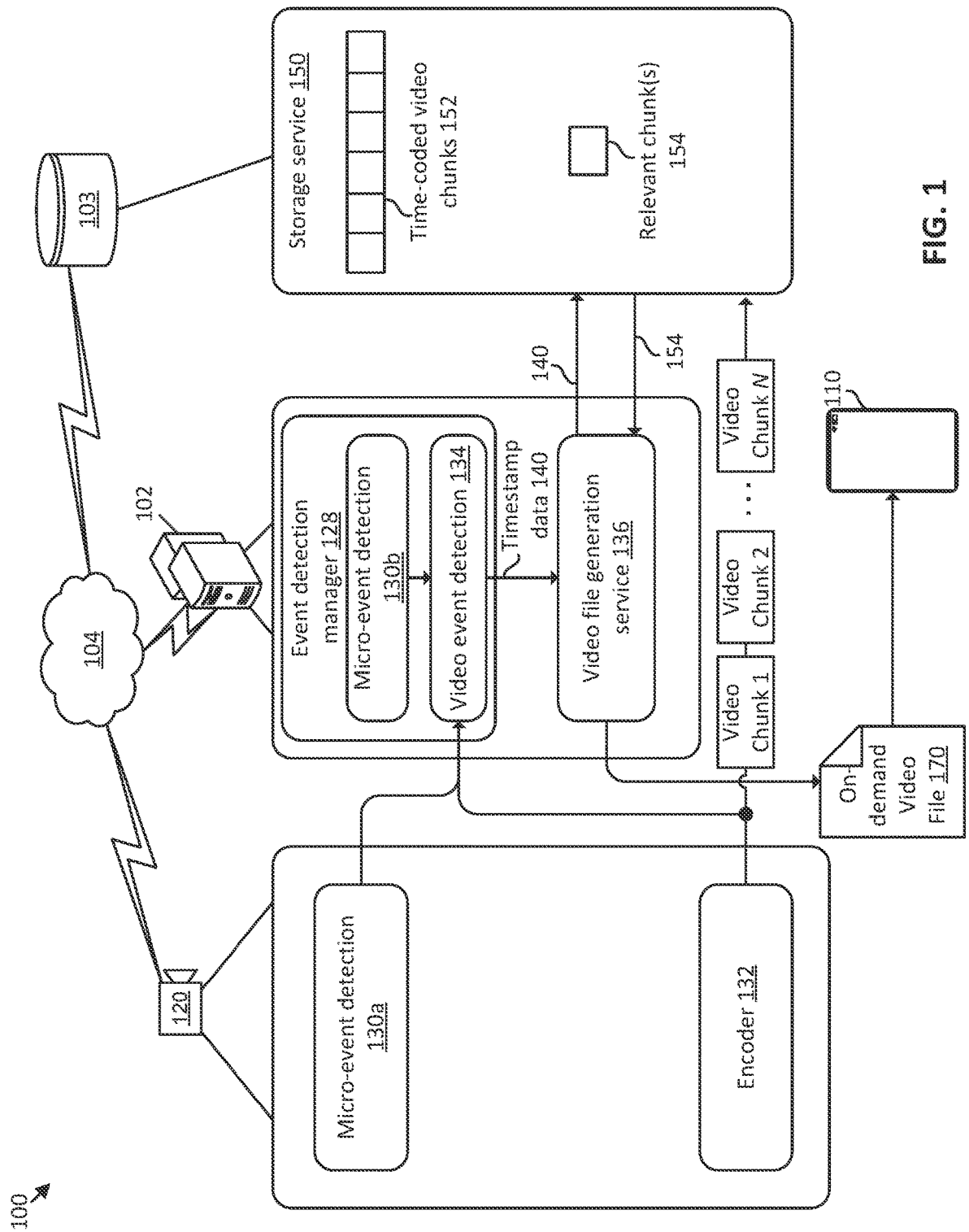
FIG. 1 is a diagram illustrating an example system for continuous video recording, storage, and on-demand event streaming, in accordance with various aspects of the present disclosure.

In the following description, reference is made to the accompanying drawings which illustrate several embodiments of the present invention. It is understood that other embodiments may be utilized and mechanical, compositional, structural, electrical operational changes may be made without departing from the spirit and scope of the present disclosure. The following detailed description is not to be taken in a limiting sense, and the scope of the embodiments of the present invention is defined only by the claims of the issued patent.

In various examples, a location such as an office building, home, outdoor space, and/or any other physical location or combination of physical locations may be monitored by one or more camera devices, e.g. camera devices of a security system or other type of camera system. In various examples, camera devices may be battery-powered and/or solar powered for ease of installation and to avoid unsightly power cords. In various other examples, camera devices may be powered through a wired interface (e.g., powered from "mains" power from a wall socket or wire(s)).

In some network-connected camera devices, motion and/or other events may be used to trigger capture and/or streaming of video (e.g., to a back-end server and/or a mobile device). For example, camera devices may include motion sensors to detect motion. Camera devices may be operated in a low power state (sometimes referred to as "sleep" mode) prior to detection of motion. In some examples, during the low power state, the camera may capture and store a limited amount of video in a rolling buffer—with the oldest portions of the video in the rolling buffer being deleted as video from the current time is stored. When motion is detected the camera device may begin encoding and/or streaming video to one or more other systems or devices (e.g., a remote video processing system or device) for storage, display, and/or processing. For example, the contents of the rolling buffer may be encoded and sent to a remote system followed by a stream of video captured by the camera while motion is detected. Waiting until motion is detected prior to capturing and/or streaming image data and/or video data may prolong battery life (and minimize power consumption) by capturing, encoding, and/or streaming video only when movement is detected. In many cases, and particularly in a surveillance context, video segments that do not depict movement and/or which represent trivial movement (e.g., leaves blowing in the wind) may not be of sufficient interest to a user of the camera system to warrant continuous video capture and/or streaming, particularly given that transmission of video data results in a quicker consumption of battery power and more frequent battery replacement. In various examples, video data may refer to one or more sequential frames of image data (e.g. image data encoded in accordance with H.264 or H.265). In such motion-triggered video streaming architectures, video data that is streamed to the cloud as a result of a motion event (or other trigger) may be stored in association with data representing a triggering event (e.g., data representing detected motion, an object detection, a doorbell button press, etc.). Data representing triggering events may also be provided to a companion application. A user may select a respective event using a user interface of the companion application to initiate streaming of the captured video associated with that respective triggering event.

An architecture in which all video data is stored in association with a corresponding triggering event may not be suitable for camera architectures employing continuous recording and/or streaming of video data (e.g., 24 hours per day, 7 days per week). This is because, unlike the triggered streaming described above, continuous streaming video is not directly associated with triggering events (even though events-of-interest may occur during the continuous stream). Described herein is a time-based architecture that can be used to associate video events (events that may be of interest to a user of the camera device) with the appropriate portions of a continuous video stream. A continuous video stream, in this context, refers to video that is captured and recorded independently of motion detection or event detection. Accordingly, continuous does not necessarily refer to unceasing capture of video. For example, the continuous video recording described herein may be manually terminated (e.g., by a user) and/or may otherwise be interrupted (e.g., due to loss of power to the camera device). In various examples described herein, video (and image) data is stored distinctly from data representing various events (and/or micro-events that make up larger, pre-defined video events). Additionally, in various examples, an independent event detection system may be deployed that is separate from a storage system that stores continuously-recorded video.

However, various technical challenges may arise in such an architecture. For example, the storage service that stores video data may store the data in video "chunks" of a static or variable size. However, a video event of interest may not correspond exactly to the boundaries of these chunks. For example, a single video event may span multiple chunks or a single chunk may include multiple video events of interest. In at least some examples, an application programming interface (API) of the storage service may not support generation, streaming, and/or downloading of files that represent portions of chunks or combinations of different chunks. Additionally, a given video event may not commence at a time that corresponds with an intra-encoded frame of video that can be individually decoded without reference to any other frame of video. The foregoing examples are merely some of the technical challenges that may arise when implementing a continuous video recording architecture that stores video independently from event data that describes detected events associated with the video. Other example challenges and/or techniques are described in further detail below. In addition, it should be noted that the various systems and techniques discussed herein may also be used in contexts in which video recording/streaming is non-continuous. In various examples, some camera devices may be configurable to switch between continuous and non-continuous recording/streaming modes.

While detection of motion may or may not be used to trigger streaming of video data from a camera device, the detection of motion may still signify a video event and/or micro-event that may be of interest to a user. Accordingly, camera devices described herein may employ motion detection systems whether or not such cameras are used for continuous or non-continuous recording/streaming. Additionally, in various examples, camera devices may be used in either continuous or non-continuous recording/streaming modes. For example, a companion application associated with a camera device may be used to configure the camera device to record and/or stream in continuous or non-continuous recording/streaming modes (among other possible configurations).

In some examples, motion may trigger a motion sensor of a camera device, which may, in turn, cause the camera device to detect a micro-event or video event. As used herein, a "video event" may refer to an event which may be of interest to a user and an event for which a video playback file may be generated that a user may view and/or delete. As used herein, a "micro-event" may refer to individual detected actions or sub-events which may make up a video event. As described in further detail below, a set of micro-events may be detected and may be determined to correspond to a particular video event. For example, a motion detection micro-event, followed by a doorbell button press micro-event, followed by a live video stream initiation micro-event, followed by a cessation of live video streaming micro-event may comprise a "Doorbell Button Press/Answer" video event. In various examples, a companion application associated with a camera device may receive notifications related to detection of verified video events. In this context, a verified video event may be an event made up of a set of predetermined micro-events. In some examples, a user may select the types of video events for which they would like to receive notifications in the companion application. Similarly, in some instances, a user may select the types of video events that they would like to ignore and/or have notifications suppressed. For example, a user may configure the settings of the system to provide notifications for doorbell press video events (e.g., push notifications), while suppressing push notifications for motion events during specified hours (e.g., between 8-9am on weekdays). In some cases, even if a notification for a particular video event is suppressed, the user may still be able to select the video event in the companion application and initiate on-demand video file generation and/or playback, as described herein.

In various examples, camera devices may include and/or be configured in communication with passive infrared (PIR) sensors effective to detect motion in an environment monitored by the PIR sensor and/or by the camera devices. PIR sensors detect infrared (IR) radiation emitted by objects within the PIR sensors' fields-of-view. In some examples, the PIR sensors may be referred to herein as "PIR motion detectors" and "PIR motion sensors". In various examples, a PIR sensor may be effective to determine when an object passes through a PTR sensor's field-of-view by determining differential changes in the IR detected by the PIR sensor.

A passive infrared sensor may comprise two pyroelectric sensing elements electrically coupled together with opposite polarization to produce an output. In this way, an equal change in temperature at both of the pyroelectric sensing elements will cancel out in the output signal, thus filtering out temperature changes in the environment. However, a change in temperature at only one of the pyroelectric sensing elements will result in an output signal that is positive or negative (depending on which pyroelectric sensing element experienced the change in temperature).

A passive infrared sensor may include two slots, each providing an optical path to one of the pyroelectric sensing elements. A passive infrared sensor may comprise one or more lenses configured to direct light received at the one or more lenses onto one of the pyroelectric sensing elements. A passive infrared sensor may include one or more lenses configured to direct light received at a first portion of the one or more lenses (e.g. a left portion) onto a first of the pyroelectric sensing elements (e.g. a left sensing element), and to direct light received at a second portion of the one or more lenses (e.g. a right portion) onto a second of the pyroelectric sensing elements (e.g. a right sensing element). The one or more lenses may comprise one or more Fresnel lenses having one or more features configured to direct light.

A passive infrared sensor may be analog, with an analog signal output, or may be digital, with digital data output generated utilizing an analog-to-digital converter (ADC) (e.g., output from the ADC or output generated based on output from the ADC).

An electronic device may include one or more passive infrared sensors that the electronic device uses to detect motion of objects. Each passive infrared sensor may output a signal or sensor data, and the electronic device may use the signal or a characteristic determined using the signal or sensor data to determine whether the passive infrared sensor detected an object. The characteristic may include a voltage represented by the signal or sensor data, an amplitude of a wave generated or determined using the signal or sensor data, an angle of the wave generated using the signal or sensor data, and/or the like.

In accordance with one or more preferred implementations, a PIR sensor includes an integrated circuit (IC) component that receives voltage inputs from one or more lines coupled to a first PIR sensing element and a second PIR sensing element. In accordance with one or more preferred implementations, the IC component receives an input from each sensing element, while in accordance with one or more preferred implementations, the IC component receives a summed voltage.

In accordance with one or more preferred implementations, the IC component determines whether a summed voltage exceeds a first threshold, and, if so, sends a logic signal (e.g. a Boolean value or an interrupt) to a controller (e.g. a microcontroller unit or MCU) of an electronic device. Based on the received logic signal, the controller begins periodically polling or requesting PTR data (e.g. a most recent data value at the time of polling) from the IC component. For example, the controller may poll the IC component at a rate of 64 Hz. In accordance with one or more preferred implementations, the logic signal represents an interrupt that triggers additional processing based on radar data and PIR data as described herein.

However, the triggering of a PIR sensor (e.g., a PIR sensor detecting a motion micro-event or video event) may rely on tunable thresholds (e.g., a threshold magnitude of differential change between the halves of a PIR sensor). If such thresholds are set too high, motion events of interest may be missed without the camera being triggered. Conversely, if such thresholds are set too low, insignificant motion events (e.g., leaves blowing in the wind, raindrops, etc.) may cause the camera device to be triggered, resulting in detection and/or notification of video events that are unlikely to be of interest to the user and potentially causing information fatigue (where the user is unlikely to pay attention to video feeds from the camera due to a large number of false positives).

Additionally, PIR sensors may have difficulties distinguishing between motion that is likely to be of interest to a user and motion that is relatively inconsequential and unlikely to be of interest to a user. For example, an outdoor PIR may trigger based on sunlight that is filtered through a tree as the wind blows the leaves of the tree and different amounts of radiation are detected by different regions and/or halves of the PIR sensor. Additionally, in scenarios where the target objects to be detected are people at relatively short distances (e.g., a PIR sensor in a video-enabled doorbell camera), large, non-target objects at greater distances, like cars passing on a street, can cause false triggering of the PIR sensor. Additionally, PIR sensors often have difficulty detecting motion when the motion is directly toward or away from the PIR sensor, as the radiation from such objects may not pass between different sensor halves and/or sensor regions and thus may not trigger the PTR sensor. To account for this difficulty, the sensitivity of the PIR sensor may be increased, which in turn, may lead to increased false triggering due to distant non-target motion.

To help eliminate false triggering in PIR motion-sensing systems that are not highly power constrained, a secondary form of motion sensing may be used to corroborate motion by the PIR sensor, individually detect micro-events or video events, etc. For example, secondary radio frequency (RF) motion detectors and video analytics in camera systems (e.g. using a machine learning model) may be used to corroborate detection of motion by a PIR sensor.

A radar sensor may use a frequency modulated continuous wave (FMCW) approach where a set of one or more frequency modulated chirps and transmitted, and the returning signals are utilized to determine distances to detected objects.

In accordance with one or more preferred implementations, a received signal is mixed with a transmitted signal (e.g. transmitted using an antenna). The received signal represents a reflection of the transmitted signal that has been received after it has reflected off of surfaces and/or objects within the environment (e.g., an environment being monitored by the radar sensor) to generate an intermediate frequency (IF) signal. The transmitted and received signals may be mixed to determine a difference between the instantaneous frequencies of each of the transmitted and received signals at that time t. This Doppler frequency may be used to detect movement along with velocity. Additionally, depending on if the transceiver is fed with a continuous wave (CW) Doppler or frequency modulated CW (FMCW), other parameters of an object can be determined such as distance to the sensor. Additionally, given an additional antenna, the position or coordinates of the object can be triangulated.

In some examples, the output data of a PIR sensor and a radar sensor may be fused and are input into a machine learning model (e.g., a supervised machine learning model, unsupervised machine learning model, etc.) that may be used to determine whether motion is detected in the monitored environment and/or whether a micro-event or video event has occurred. The machine learning model may be trained using annotated training data that provides examples of positive motion events and negative motion events (together with the attending PIR and radar data). Accordingly, the machine learning model may learn common false positive and false negative scenarios and may thereby provide more accurate and useful motion detection.

Machine learning techniques, such as those described herein, are often used to form predictions, solve problems, recognize objects in image data for classification, etc. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

To train a machine learning model, a cost or "loss" function may be utilized that describes the difference between expected output of the machine learning model and actual output. Parameters (e.g., weights and/or biases) of a machine learning model may be updated based on annotated training data to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

A video may be represented by a number of video frames that may be displayed in sequence during playback, with each video frame being comprised of rows and columns of pixels arranged in a two-dimensional grid. The resolution of a particular video frame is described by the width of the frame, in terms of a first number of pixels, by the height of the frame, in terms of a second number of pixels. Video frames may be compressed using different picture types or frame types, such as intra-coded pictures or frames, predicted pictures or frames, and/or bi-predictive pictures or frames. Generally, the term "frame" is used to refer to an entire image captured during a time interval (e.g., all rows and columns of pixels comprising a particular image). Generally, the term "field" is used to refer to part of a frame, e.g. either the odd-numbered or even-numbered scanning lines of the frame. Generally, the term "picture" is used to refer to either a frame or a field. For simplicity, in some cases, various techniques described herein may be described in reference to "frames" or "pictures" even though actual operations may be performed on pixels and/or groups of pixels (e.g., on frame data or picture data).

It will be appreciated that, generally, the amount of data required to represent a video frame will increase as the resolution of the video frame increases (given a relatively constant frame rate), and as the frame rate increases (given a relatively constant resolution). It will be appreciated that given the amount of data required to represent a frame, videos recorded at even a moderate resolution and frame rate will quickly begin to require a very large amount of data for representation. This is especially problematic for video streaming, as most networks have bandwidth limitations.

To ameliorate this, video data is frequently compressed to reduce the amount of data necessary to represent a given length of video at a given resolution. This compression is generally characterized as encoding video data.

So-called lossy compression typically refers to intra-frame compression where the amount of data used to represent a given picture is reduced relative to a raw or native format of the picture. One common example of intra-frame compression uses a frequency domain-based image transform such as a discrete cosine transform (DCT), a Fourier transform, a Hadamard transform, an integer transform, etc., to represent the image data in the frequency domain.

In DCT, coefficients of different frequency cosine waves are calculated based on the contribution of the different frequency cosine waves to the portion of the image being encoded. After subjecting image data to a DCT, the lower frequency cosine wave coefficients are typically much larger relative to the higher frequency cosine wave coefficients. This is due to the higher frequency cosine waves typically having a less significant impact (i.e., the higher frequency cosine waves contribute less to the image or portion of the image) on the image being encoded and the lower frequency cosine waves having a more significant impact on the image being encoded. The coefficients of the different frequency cosine waves may be divided by quantization factors during a quantization process and rounded to the nearest integer, to further compress the data. In various examples, the quantization factors may be determined using a rate control algorithm. A rate control algorithm may solve an optimization problem to determine the number of bits that should be used to encode macroblocks (two-dimensional groupings of contiguous pixels in the picture) of image data and/or a frame of image data at a given level of image quality and/or at a given level of distortion. In some other examples, a rate control algorithm may solve an optimization problem to determine a level of image quality at a given number of bits. Image quality may be determined using peak signal to noise ratio (PSNR) and/or structural similarity index (SSIM), for example.

After quantization, several zero value coefficients are typically present in the high frequency cosine wave range of the compressed image data. The list of quantized coefficients can be serialized using, for example, a "zig zag" scan of the array of quantized coefficients. The serialized list of quantized coefficients can be further compressed using an entropy encoding process, such as binary arithmetic encoding or Huffman encoding, to reduce the number of bits necessary to represent the compressed image data.

Reference frames are frames of a compressed video that are used to define other frames and come in various types. A compressed video may comprise one or more frames that do not include all of the pixel data within the frames themselves, but rather reference pixel values of other frames (e.g., reference frames). Intra-coded frames ("I-frames") include detailed pixel data in order to be self-decodable and to provide reference pixel values for other inter-coded frames. As a result, I-frames do not require other video frames in order to be decoded, but provide the lowest amount of data compression.

An encoding approach can encode a frame as an intra-coded frame, or encode a picture as an intra-coded picture. Regions other than a frame or field can be defined and utilized for encoding as well. For example, an encoding approach can utilize a "slice" representing a defined region of a frame or picture that is encoded separately from any other region. In an approach utilizing slices or other portions, such as H.264, a frame or picture can be characterized as intra-coded if all of the slices or portions making up the frame or picture are intra-coded.

Predicted frames ("P-frames") contain only the changes in the pixel values from the previous frame, and therefore P-frames use data from previous frames to decompress the P-frame. As a result, P-frames are more compressible than I-frames. Bi-predictive frames ("B-frames") can be decoded using both previous and forward frames for data reference. As set forth above, frequent transmission of I-frames can cause network congestion and/or jitter because of their increased size (e.g., the number of bits of data comprising the I-frame) relative to the P-frames and B-frames.

An encoding approach can encode a frame as an inter-coded frame such as P-frame or B-frame, or encode a picture as an intra-coded picture, such as a P-picture or a B-picture. Regions other than a frame or field can be defined and utilized for encoding as well. For example, an encoding approach can utilize a slice representing a defined region of a frame or picture that is encoded separately from any other region.

Just because a frame is intra-coded and does not reference the contents of another frame, that does not necessarily mean that it does not depend on a decoder having been set up with a particular state. Thus, just because a frame is intra-coded, that does not mean that receiving that frame is enough to allow decoding from that point. A key frame is a frame that is configured to act as a decoder refresh and allow decoding to proceed from that frame.

For example, in H.264 an instantaneous decoder refresh frame (IDR-frame) is a special intra-coded frame (an I-frame) that acts as a key frame. Conventionally, the IDR-frame causes all reference pictures in a decoded picture buffer (DPB) to be flushed, so that no subsequent video frames can reference any picture prior to the IDR-frame. Conventionally, this means that segments defined by these IDR-frames are self-decodable and do not depend on or reference any pictures in previous segments. The segments may be characterized as a group of pictures (GoP). The GoP size may indicate a number of frames that may be encoded until the next IDR-frame is encoded. For example, if the GoP size is 50, an encoder device may encode an I-frame followed by 49 inter-coded frames which may reference the I-frame. Conventionally, the $51^{st}$ frame would again be encoded as an I-frame at the start of the next GoP. In various examples, implementations of encoding and/or decoding techniques are described with respect to "frames" of image data (e.g., inter-coded frames, frame numbers, etc.). However, it should be noted that such example techniques involving frames could similarly be applied in the context of pictures (e.g. inter-coded pictures, picture numbers, etc.), slices, and other portions.

FIG. 1 is a diagram illustrating an example system 100 for continuous video recording, storage, and on-demand event streaming, in accordance with various aspects of the present disclosure. In various examples, the system 100 may include a camera device 120 configured in communication with one or more remote computing device(s) 102, and/or one or more non-transitory computer-readable memories 103. In various examples, the computing device(s) 102 may be configured in communication over a network 104. Although depicted as separate components in FIG. 1, the computing device(s) 102 may be part of the camera device 120. In some examples, the computing device(s) 102 may be implemented in one or more chips of camera device 120. For example, one or more of the techniques used by the computing device(s) 102 may be performed using an application specific integrated circuit (ASIC) and/or using a field programmable gate array (FPGA). In some other examples, various techniques described herein may be instantiated in software executed by one or more processors of the camera device 120, computing device(s) 102 and/or some combination thereof.

Network 104 may be a communication network such as a local area network (LAN), a wide area network (such as the Internet), or some combination thereof. The one or more computing devices implementing the motion detector 502 may communicate with non-transitory computer-readable memory 103 (e.g., either locally or over network 104). The non-transitory computer-readable memories 103 may store instructions that may be effective to perform one or more of the various techniques described herein.

Camera device 120 may be configured to operate in a continuous video recording mode or non-continuous video recording mode. For example, a companion application to the camera device 120 (e.g., executing on mobile device 110) may be used to configure the camera device 120 to operate in continuous recording mode or motion-triggered (or event-triggered) recording mode. The camera device 120 may comprise a hardware and/or software based encoder 132 configured to encode video for transmission and/or storage. In the example depicted in FIG. 1, the encoder 132 may encode video captured by camera device 120 as video chunks (using any desired video encoding technology, such as H264/H265, AV1, VP9, etc.). Each video chunk may represent a portion of video data. In some examples, the chunks may be a predetermined time length of video (e.g., 120 seconds or any other desired time length). In some examples, the chunks may be encoded to be within the predetermined time length (to within a tolerance (e.g., 5%, 10%, etc.). However, in some other examples, the chunks may be of a variable time length. For example, the chunks may be of a predetermined file size (e.g., to within a tolerance (e.g., 10%)).

The recorded video (e.g., video chunks 1, 2, . . . N) may be sent by the camera device 120 to a storage service 150 that may be configured to store the video for later streaming or playback (e.g., via a companion application executing on mobile device 110). As shown in FIG. 1, the video chunks may be stored as time-coded video chunks 152, where each chunk may be associated with a start time (e.g., time stamp data indicating a start time for the chunk) and an end time (e.g., a time stamp data indicating an end time for the chunk). The time stamps may be relative to a global clock and/or a clock of the camera device 120 or of the computing device(s) 102.

In various examples, the video data that is encoded by encoder 132 and sent to storage service 150 may not be stored with any data indicating video events (e.g., motion events, object detections, etc.). Instead, the computing device(s) 102 may separately detect video events that may be associated with the recorded video stored by storage service 150, as described herein. For example, camera device 120 and/or the event detection manager 128 may detect various micro-events (at micro-event detection 130a and micro-event detection 130b, respectively). Micro-events may be various actions either detected in the video itself (e.g., motion events, human detections, action detections, etc.) or related to the video, camera device 120, and/or playback of video (e.g., a button press on the camera device 120, a start of live-video playback, a termination of live-video playback, etc.). One or more micro-events may make up a "video event." As used herein, a "video event" refers to a set of one or more micro-events (e.g., a predefined set of micro-events) that may be of interest to a user of the camera device 120.

For example, as described below in reference to FIG. 3, an "Answered Button Press" may be an example of a video event (e.g., a button press on a camera-enabled doorbell device) that may comprise the micro-events "Motion start" (e.g., a detection of motion by a motion sensor of the camera device 120), "Button Press" (e.g., a detection of a button press on the camera-enabled doorbell device), "Live View Start" (e.g., an initiation via a companion application of a live video stream from the camera-enabled doorbell device), and "Live View Stop" (e.g., a termination of the live video stream).

As shown in FIG. 1, the micro-event detections (e.g., micro-event detections 130a, 130b) may occur on the camera device 120 or at an event detection manager 128 executed by computing device(s) 102. Various technologies may be used to determine the micro-events. For example, PIR-based motion sensors, radar-based motion sensors, and/or inter-frame motion evaluation (macroblock difference comparisons) may be used to detect a motion detection micro-event. Conversely, a data signal indicating a doorbell button press may be generated upon receiving the button press and may be sent to the event detection manager 128. In still other examples, computer vision techniques executed either on the camera device 120 and/or on the event detection manager 128 may be used to detect humans, objects, animals, actions, etc., where such detections may, in some cases, constitute micro-events.

Video event detection 134 may comprise analyzing detected micro-events to determine whether the detected micro-events implicate a video event. Video event detection 134 may be implemented in various ways. For example, in some cases, video events may be pre-defined as including a certain set of micro-events. Accordingly, if the set of micro-events has occurred (e.g., within a certain amount of time), the video event detection 134 may determine that the pre-defined video event has occurred. For example, a "person detection" video event may include the micro-event "Motion detected" followed by the micro-event "human detected." Accordingly, if video event detection 134 detects these two micro-events within a certain time threshold (e.g., within 1 minute of one another), the video event detection 134 may detect the "Person Detection" video event and may generate the time stamp data corresponding to this video event. In some examples, certain micro-events (e.g., session end events) may trigger the video event detection 134 to analyze the set of detected micro-events to determine if the most recent micro-events (e.g., those within a pre-defined time threshold prior to the session end event) correspond to a pre-defined video event. In other examples, a machine learning model may take data representing detected micro-events as input and may predict whether any video events are implicated by these micro-event detections. For example, the machine learning model may be trained in a supervised fashion using training instances comprising a set of micro-events and a corresponding video event label (including null labels for sets of micro-events that do not correspond to a true video event). In some examples, the companion application executing on mobile device 110 may provide a tool to enable a user to define their own video events. In such instances, the micro-events making up a user-defined video event may be detected automatically using micro-event detections 130a, 130b or may be manually defined by the user.

Although not shown in FIG. 1, upon detection of a video event, data representing the detection of the video event may be sent by event detection manager 128 to a companion application of the camera device 120. The data may indicate that a video event has been detected and may include other information such as a thumbnail representing the video event, a name of the video event, a time at which the video event was detected, etc. A list of detected video events may be displayed in the companion application (e.g., executing on mobile device 110). However, in at least some examples, until a user selects a video event for playback through the companion application, the video representing the video event may not yet be available on the companion application. For example, until a user selects a video event for playback through the companion application, a concise video file that represents only the selected video event may not yet exist and may be generated in an on-demand fashion, as described below.

For example, when a user selects a video event (e.g., by clicking on a particular thumbnail and/or name of a detected video event in the companion application), a request may be sent to the event detection manager 128 for the selected video event. Upon receipt of the request, the event detection manager 128 may send the timestamp data 140 associated with the event to a video file generation service 136. The timestamp data 140 may include a start time for the event (e.g., a time at which the first constituent micro-event of the video event was detected and/or a few seconds prior to the first constituent micro-event (pre-roll)) and an end time for the event (e.g., a time at which the last constituent micro-event (e.g., end_live_view_session) of the video event was detected and/or a few seconds after the last constituent micro-event was detected (to ensure that all actions of interest are represented by the video).

The video file generation service 136 may receive the timestamp data 140 and may query the storage service 150 using an API request comprising the timestamp data 140. However, in many cases, distributed storage systems may not be able to return portions of chunks of stored video. Accordingly, should the timestamp data 140 span multiple chunks and/or represent only a portion of a chunk, the API of the storage system may not support returning only the requested portion of video that corresponds exactly to the timestamp data 140. Instead, the storage service 150 may return any chunks implicated by the timestamp data 140. For example, if the start time of the timestamp data 140 is in the middle of chunk 1 and the end time of the timestamp data 140 is in the middle of chunk 3 (where chunks 1, 2, and 3 represent contiguous video segments), the storage service 150 may return chunks 1, 2, and 3 to the video file generation service 136 (as relevant chunks 154). Conversely, if the start time and the end time of the timestamp data 140 are both within chunk 2, the storage service 150 may return only chunk 2 as the relevant chunk 154.

However, the relevant chunk(s) 154 returned by the storage service 150 may include a significant portion of video that is not relevant to the requested video event and which may therefore be uninteresting to the user. This is because the chunks of video streamed to the storage service 150 for storage may not correspond, time-wise, to the events that occur within the video. Accordingly, the video file generation service 136 may identify the constituent frame of video corresponding to the start time of the timestamp data 140 (e.g., the start time of the requested vide event) and the constituent frame of video corresponding to the end time of the timestamp data 140 and may generate a video file (e.g., on-demand video file 170) corresponding to only this portion of the relevant chunk(s) 154. As described in further detail below, in some cases, the video frame corresponding to the start time of the timestamp data 140 may not be self-decodable. For instance, the video frame corresponding to the start time of the timestamp data 140 may be an inter-encoded frame representing differences between the current frame and one or more other frames (e.g., a P-frame or a B-frame). Or, the video frame corresponding to the start time may be an intra-encoded frame that nonetheless does not operate as a random access picture. Accordingly, video file generation service 136 may select an intra-encoded frame (e.g., an I-frame, key frame, instantaneous decoder refresh (IDR) frame, random access picture, etc.) that is just prior to the original start time frame (e.g. an inter-encoded frame or, in at least some implementations, possibly an intra-encoded frame that does not function as a random access picture) as the initial frame of the on-demand video file 170. In accordance with one or more implementations, the system may modify a start time in the time stamp data 140 associated with the event, or store a new modified start time in the time stamp data 140 associated with the event.

In other examples, the video file generation service 136 may transcode an intra-encoded frame for the start-time position (e.g., by combining the image data from a previous I-frame and the data of the inter-encoded frame (e.g., a P-frame) corresponding to the start time of the video event).

In accordance with one or more implementations, in response to the selection by the user of the video event on the companion application, a new on-demand video file is generated (e.g. on-demand video file 170), while in accordance with one or more implementations, existing video chunks are simply sent together with time stamp information. In accordance with one or more preferred implementations, a video file is generated based on start and end times that have been updated or adjusted based on selection of an intra-encoded frame (e.g., an I-frame, key frame, IDR frame, random access picture, etc.) that is just prior to the original start time frame (e.g. an inter-encoded frame or, in at least some implementations, possibly an intra-encoded frame that does not function as a random access picture).

The on-demand video file 170 may be sent to the mobile device 110 in response to selection by the user of the video event on the companion application and may be played back. Additionally, the user may scrub within the on-demand video file 170 and/or use on-screen controls to fast forward, pause, and/or rewind playback. In the architecture described in FIG. 1, the video events (including micro-events) are separately detected and are not stored in association with the video data itself (e.g., the chunks stored in storage service 150). Indeed, in some implementations, concise video files that depict specific video events (e.g., on-demand video file 170) do not exist prior to selection by the user of the detected event in the companion application. This architecture simplifies continuous video recording and event detection and streaming by logically separating event detection from video recording and/or logically separating storage of data for events from storage of video data.

Figure 2:
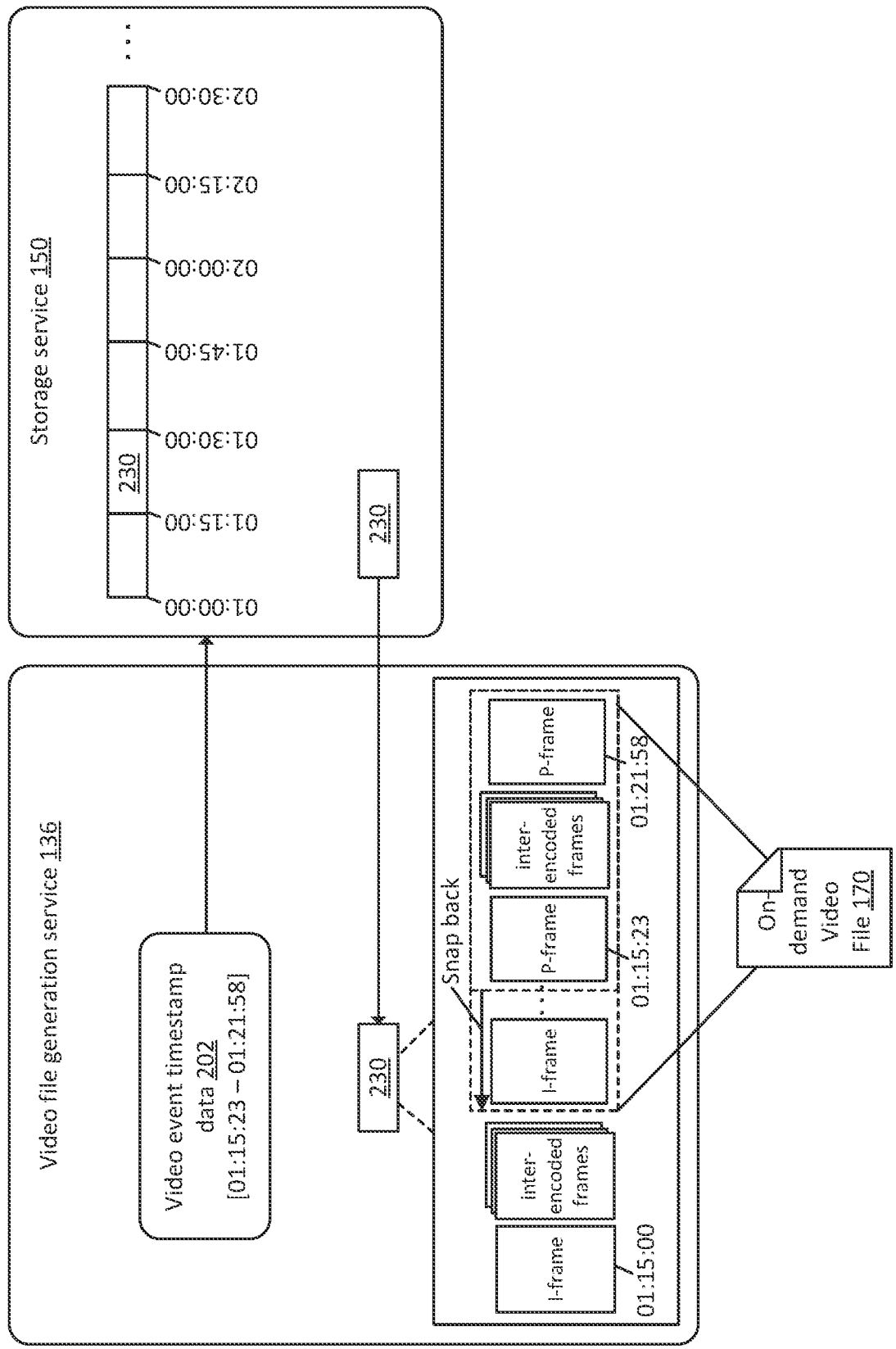
FIG. 2 depicts example retrieval and processing of video event data, in accordance with various aspects of the present disclosure.

FIG. 2 depicts example retrieval and processing of video event data, in accordance with various aspects of the present disclosure. In the example of FIG. 2, a user of the companion application of the camera device 120 may have selected a particular video event for playback. Accordingly, the event detection manager 128 may send the video event timestamp data 202 corresponding to the user-selected video event to the video file generation service 136. In the example, the video event timestamp data 202 has a start time of 01:15:23 and an end time of 01:21:58.

As shown in FIG. 2, the storage service stores a plurality of chunks of video data recorded by the camera device 120. The boundary between contiguous chunks may be defined by a time code representing a time at which one chunk ends and the next sequential chunk of the video begins. Video file generation service 136 may send the timestamp data 202 as part of a query of an API of storage service 150. Accordingly, the storage service 150 may process the request to determine the relevant chunk(s). In this example, chunk 230 corresponds to video between time code 01:15:00 and 01:30:00 (in the example of FIG. 2, each chunk represents a 15 minute segment of video). Since the video event timestamp data 202 has a start time of 01:15:23 and an end time of 01:21:58, the video event corresponds to chunk 230. Accordingly, chunk 230 may be returned to video file generation service 136 in response to the request. However, if the video file generation service 136 were to simply playback the entire chunk, the user would have to wait 23 seconds until the video event began occurring. This may lead to a frustrating user experience.

Accordingly, the video file generation service 136 may determine the frame of the chunk 230 that corresponds to the start time of the video event (e.g., 01:15:23). Depending on the frame rate and the granularity of the timestamp data, the start time may correspond to multiple frames. In the example depicted in FIG. 2, the start time of 01:15:23 corresponds to a P-frame. Since this is an example of an inter-encoded frame that is not self-decodable, the video file generation service 136 may select the I-frame (e.g., an intra-encoded frame that is self-decodable) that immediately precedes the P-frame that is associated with the video event start time. Accordingly, the video file generated by the video file generation service 136 to represent the user-selected video event may be "snapped back" to the closest I-frame preceding the P-frame at start time 01:15:23, as shown. In an alternate implementation, an I-frame may be transcoded at 01:15:23 using the preceding I-frame and the P-frame at 01:15:23 and used as the start of the on-demand video file 170. It should be noted that, while in FIG. 2 the chunk 230 appears to end at the P-frame at 01:21:58, the chunk 230 instead actually ends at 01:30:00. However, the chunk 230 may be trimmed so that the on-demand video file 170 generated by the video file generation service 136 only includes encoded frames up until the end time of 01:21:58.

The on-demand video file 170 may be generated in response to user selection of an event on the companion application to the camera device 120. After generation of the on-demand video file 170, the on-demand video file 170 may be sent to the companion application for playback so that the user may view video of the detected and user-selected video event.

Figure 3:
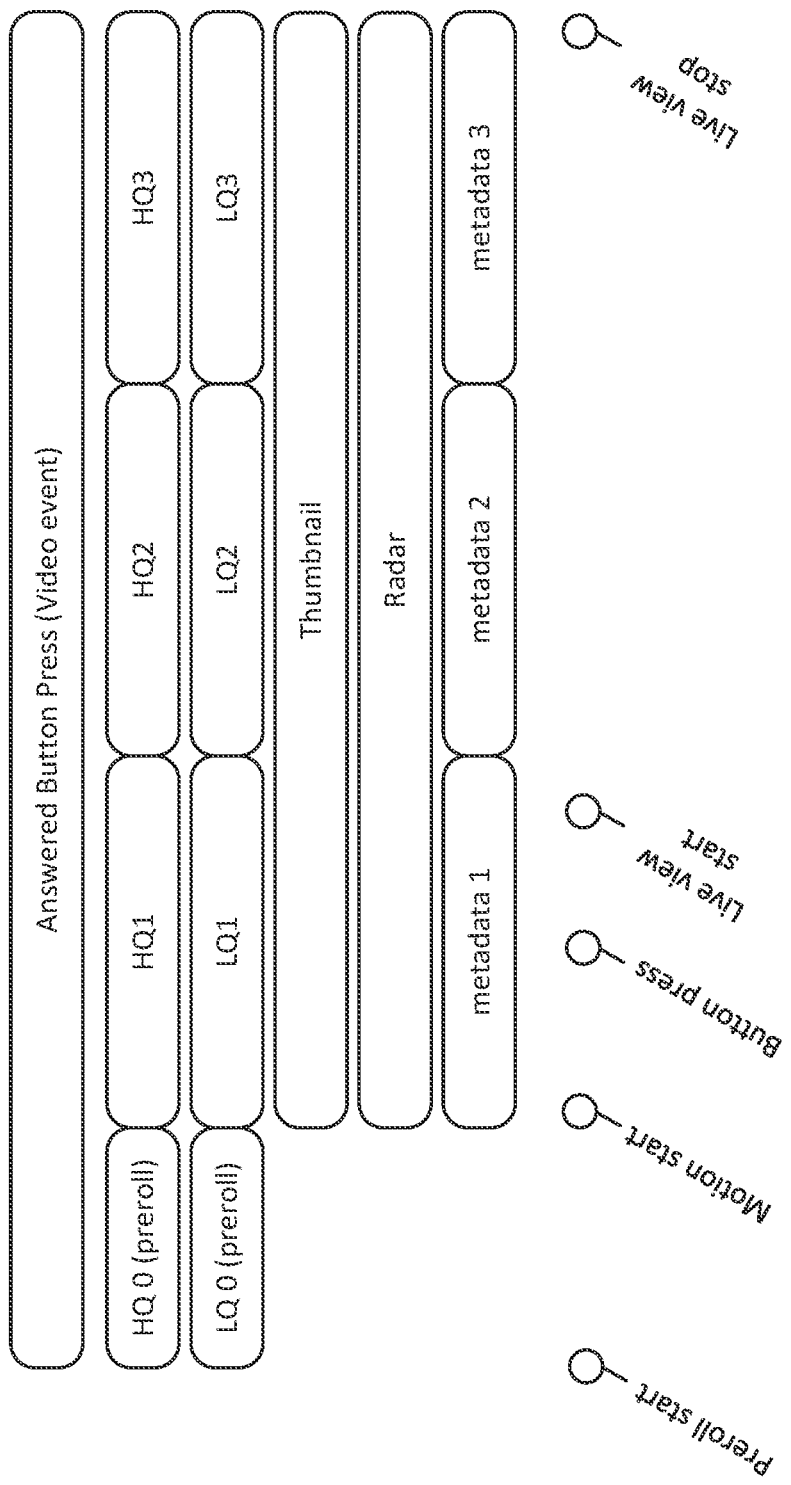
FIG. 3 depicts an example of video event detection using detected micro-events, in accordance with various aspects of the present disclosure.

FIG. 3 depicts an example of video event detection using detected micro-events, in accordance with various aspects of the present disclosure. In the example of FIG. 3 HQ 0, HQ 1, HQ 2, HQ 3 represent high quality video chunks and LQ 0, LQ 1, LQ 2, LQ 3 represent corresponding low quality video chunks (e.g., in an adaptive streaming example where multiple streams having different bitrates and/or quality levels are stored). In various examples, the video data (e.g., video and audio data) may be transmitted to the storage service 150 (and/or to a media server separate from the storage service 150) as a stream of data using the Real-time Transport Protocol (RTP). A media server of the storage service 150 (or separate from the storage service 150) may generate video segments of various qualities (e.g., mp4 files representing video segments, such as chunk 230). In some examples, the high quality video chunks (including HQ 0, HQ 1, HQ 2, HQ 3, etc.) may be processed to produce lower-quality video chunks (e.g., including LQ 0, LQ 1, LQ 2, LQ 3). The companion application, when requesting playback of a particular video event, may first be sent a lower-quality video file (prepared using the various techniques described herein) so that playback may begin quickly. During playback of the lower-quality video file, the higher-quality video file (e.g., a file comprising the chunks HQ 0, HQ 1, HQ 2, HQ 3, etc.) may be downloaded and the playback may be switched to the higher-quality video stream when available on the companion application.

Various detected micro-events are displayed at the bottom of FIG. 3, including "Motion start", "Button Press", "Live view start", and "Live view stop." In the example of FIG. 3, the "live view stop" micro-event may trigger the event detection manager 128 to analyze the preceding detected micro-events to determine whether they correspond to a pre-defined set of micro-events associated with a pre-defined video event (e.g., a verified video event). In some examples, video events may be made up of two or more micro-events. However, a video event may be defined by a single micro-event, if desired. In some examples, two video events may overlap in time (with the set of micro-events for a first video event overlapping the set of micro-events for a second video event). Similarly, a given micro-event may be part of multiple video events. Each micro-event may be timestamped. Additionally, individual micro-events may be associated with time to live (TTL) values. In some examples, after the expiration of a TTL of a micro-event, the micro-event may no longer be considered for further video event detection. TTL values may be used to limit the amount of processing for detection of video events (by limiting the time window of micro-events that are considered as potentially pertaining to a particular video event).

In the example of FIG. 3, the set of micro-events (e.g., "Motion start", "Button Press", "Live view start", and "Live view stop") correspond to the video event "Answered Button Press." Accordingly, timestamp data may be generated corresponding to the video event "Answered Button Press." In the example, a timestamp that is prior to the "Motion start" micro-event may be selected to obtain some pre-roll prior to the start of motion. As shown, the micro-events do not necessarily correspond to the start of a given chunk of video (since video recording/storage and event detection may be logically separated, as previously described). For instance, the button press micro-event, which may be data representing a button press detection received from the camera device 120, is received in the middle of a video chunk (e.g., HQ1 and LQ1). In the example of FIG. 3, the thumbnail block represent thumbnail generation for the corresponding video chunks. Similarly, the radar block represents radar-based motion sensor data generated for the corresponding video chunks and metadata blocks represent metadata generated for the corresponding video chunks (e.g., packet loss, bitrate, etc.). In various examples, a given chunk of video may commence with an I-frame. However, there may be one or more groups-of-pictures (GoPs) within a given chunk. Additionally, the GoP size may be dynamically adjusted during recording by camera device 120, as described in further detail below.

In FIG. 3, since the event detection manager 128 has detected the Answered Button Press video event, the event detection manager 128 may send data to the companion application indicating that the Answered Button Press video event has been detected. This data may include the timestamps of the Answered Button Press video event, one or more thumbnails related to the video event, the name of the video event, etc. For example, the video event may be displayed in the companion application (e.g., in a list of detected video events) as:

EVENT—Answered Doorbell Button Press—10:57 pm, Jan. 3, 2023 [Thumbnail]

The foregoing notification is merely an example. The particular notification and/or display of the detected video event in the companion application may vary depending on the desired implementation.

Other examples of micro-events may include detection that a streaming session has been initiated, detection that a source has connected (e.g., a camera device has connected to the streaming session), detection that a client has connected to the streaming session (e.g., a companion application executing on a mobile device), detection that a client has disconnected, detection that a client has answered a notification (e.g., the user has viewed the video or has otherwise responded to a notification), unverified motion (e.g., where motion is detected by one motion sensor, but is uncorroborated by another motion sensor or by computer vision), on-demand live view feed (e.g., a live video feed) initiated, a "knock" has been detected (e.g., via microphones), etc. It should be noted that the particular micro-events may be defined according to the desired implementation and the functionality, hardware, and/or capabilities of the camera device(s).

Figure 4:
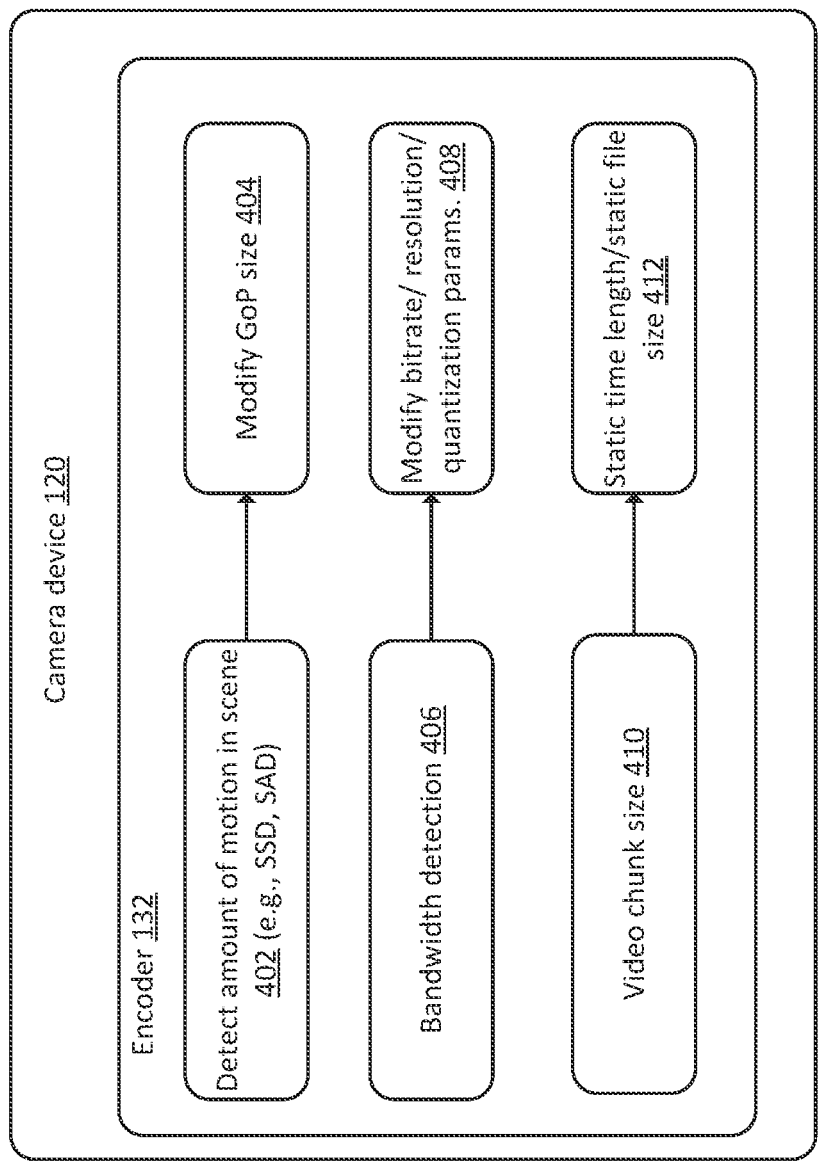
FIG. 4 depicts various actions that may be used by a camera device during continuous video recording, in accordance with various aspects of the present disclosure.

FIG. 4 depicts various actions that may be used by camera device 120 during continuous video recording, in accordance with various aspects of the present disclosure. As described, in various examples, the camera device 120 may continuously and/or semi-continuously record and/or stream video data. Accordingly, camera device 120 may dynamically configure the encoder 132 according to various parameters. For example, the encoder 132 may detect the amount of motion in a given scene (e.g., over the course of a time period (e.g., 1-2 seconds) and/or between two frames of video data) (block 402). Various techniques may be used to determine the amount of motion in the scene. For example, a frame of image data (a constituent frame of the video) may be divided into blocks of pixels (sometimes referred to as macroblocks). In a given fame, each macroblock may be associated with a value (e.g., an average pixel value of the macroblock). Motion may be estimated by determining the difference between macroblock values in a first frame and the values of the corresponding macroblocks in a second frame. The corresponding macroblock may be the macroblock that is at the same relative location in both frames (e.g., the macroblock in the top-left corner of the first frame may be compared with the macroblock in the top-left corner of the second frame). Various techniques, such as calculating the sum of squared differences (SSD) of all macroblock values or the sum of absolute differences (SAD) of all macroblock values may be used to estimate the amount of motion between the two frames. Additionally, the amount of motion between each set of two frames over a given time period (e.g., 2 seconds at a given frame rate) may be averaged and used to estimate the amount of motion over that time period. The encoder 132 may modify the GoP size based on the amount of detected motion (block 404). In general, if little to no motion is occurring and the scene is relatively static, the GoP size may be increased. Conversely, if there is a lot of motion in the scene, the GoP size may be reduced. Generally, increasing the GoP size reduces the bit rate as fewer I-frames (which generally require the most memory) are encoded over time. In addition to modification of GoP size at block 404, the encoder 132 may also modify other encoder parameters (e.g., quality of picture (QoP) parameters, quantization parameters, rate control parameters, etc.).

In accordance with one or more implementations, unverified motion (e.g., where motion is detected by one motion sensor (such as a PIR detector), but is uncorroborated by another motion sensor or by computer vision, may nonetheless trigger a change in group of picture size or recording resolution, e.g. for some set amount of time prior to reverting to a previous state. For example, motion detection by a PIR or PIR and radar that is not verified by computer vision (e.g. not determined to correspond to a person) may nonetheless trigger a reduction in a group of picture size and/or an increase in resolution.

In accordance with one or more implementations, motion or activity that would potentially trigger an alert or notification but for user configuration settings may nonetheless trigger a change in group of picture size or recording resolution, e.g. for some set amount of time prior to reverting to a previous state. For example, in accordance with one or more implementations a user may configure a camera device to utilize one or more motion zones or one or more radar zones, and motion detection that is outside of configured zones may nonetheless trigger a reduction in a group of picture size and/or an increase in resolution.

In some other examples, the encoder 132 may detect fluctuations in bandwidth when communicating with the computing device(s) 102 and/or the storage service 150 over the network 104 (block 406). The encoder 132 may modify various parameters in response to changing bandwidth (block 408). For example, the encoder 132 may reduce the resolution of video in response to a decrease in bandwidth (or increase resolution in response to an increase in bandwidth). In some examples, the encoder 132 may modify a quantization parameter used to quantize video data in order to increase or decrease the bitrate (instead of or in addition to modifying the resolution).

In some further examples, instead of storing static time length sized video chunks, the system may store fixed size (in terms of an amount of memory used to store the data) video chunks 410 (block 412). This may be beneficial as it may reduce jitter and maintain a more consistent throughput.

In some examples, the companion application of camera device 120 may have settings to enable a user to snooze and/or silence certain event detections. For example, a user may set up motion zones wherein, if motion is detected within such a zone, no motion event may be generated and/or the application may not provide a notification of a detected event. For example, if a street is visible within the field-of-view of the camera device 120 a user may want to avoid notifications from movement occurring in the street (e.g., to avoid being notified each time a car passes on the street). However, in some examples, the companion application may display a notification that an event would have been detected, but for the configuration settings of the camera device/application. Optionally, a selectable control may be added to the graphical interface that the user can select to reconfigure their camera device and/or application settings to be notified of and/or have such video events listed in the future. Accordingly, in such examples, the micro-event detections 130a, 130b and the video event detection 134 described above in reference to FIGS. 1 and 3 may be performed multiple times for different camera settings and/or application settings to detect both filtered out video events and non-filtered video events.

Figure 5:
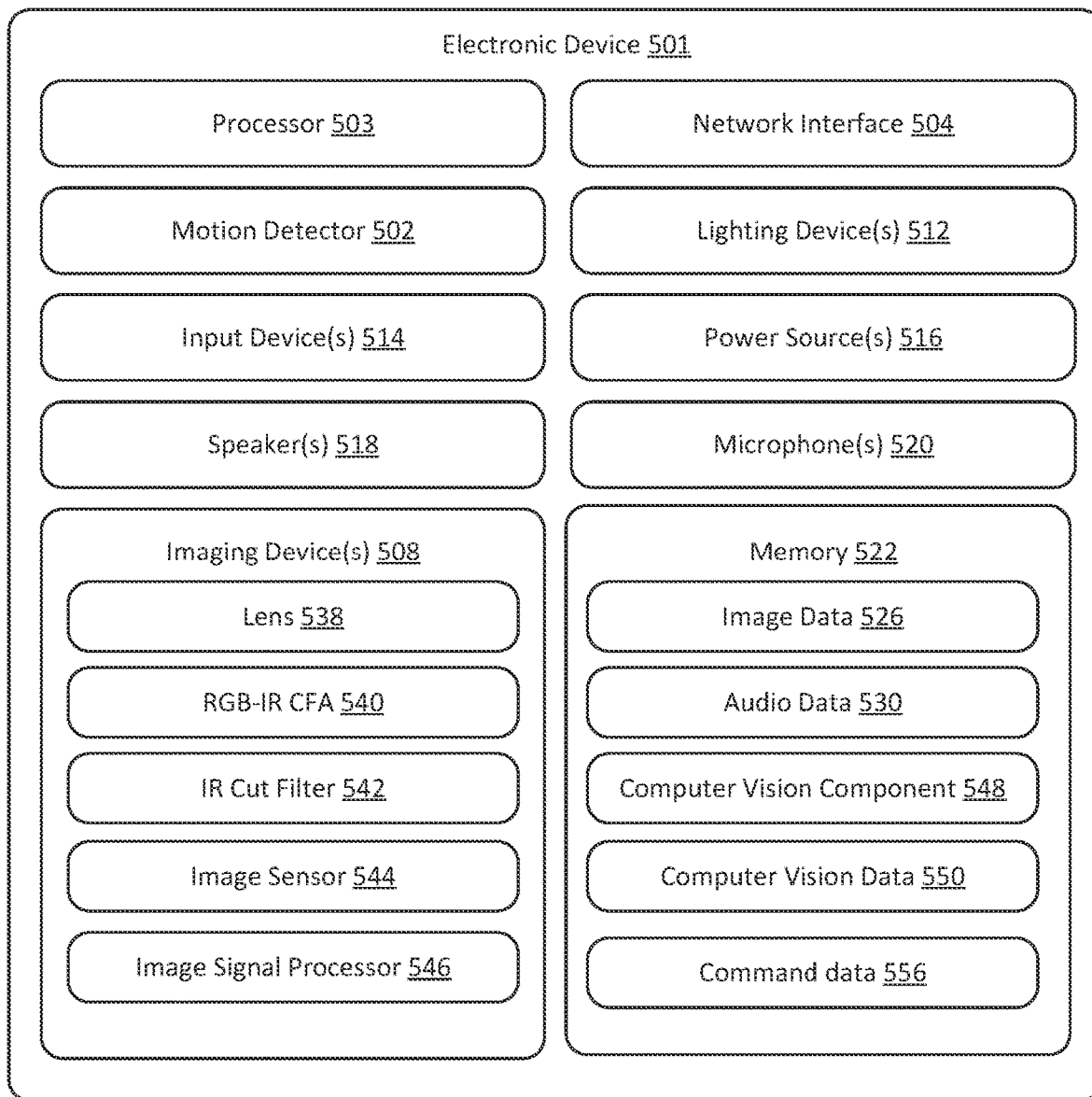
FIG. 5 depicts an example camera device, in accordance with various aspects of the present disclosure.

FIG. 5 depicts an example electronic device 501 that may implement, in whole or in part, camera device 120. As shown, the electronic device 501 may include one or more processors 503, one or more network interfaces 504, one or more motion detectors 502, one or more imaging devices 508, one or more lighting devices 512, one or more input devices 514, one or more power sources 516, one or more speakers 518, one or more microphones 520, and memory 522. In various examples, the electronic device 501 may be an example of a camera device, such as camera device 120 shown and described in reference to FIG. 1.

As described herein, the motion detector 502 may include one or more (alone or in combination) different types of motion sensors. For example, in some embodiments, the motion detector 502 may comprise passive infrared (PIR) motion sensors, which may be secured on or within a PIR sensor holder that may reside behind a lens (e.g., a Fresnel lens). As previously described, the PIR sensors may detect IR radiation in a field of view, and produce an output signal (typically a voltage) that changes as the amount of IR radiation in the field of view changes. The amount of voltage in the output signal may be compared, by the processor(s) 503, for example, to one or more threshold voltage values to determine if the amount of voltage in the output signal is indicative of motion, and/or if the amount of voltage in the output signal is indicative of motion of an object that is to be captured by the imaging device(s) 508. In some examples, the processor(s) 503 may determine the distance based on the amount of voltage in the output signal. Additionally, or alternatively, in some examples, the processor(s) 503 may determine the distance based on which motion detector 502 detected the object.

Although the above discussion of the motion detector 502 primarily relates to PIR sensors, depending on the example, the motion detector 502 may include additional and/or alternate sensor types that produce output signals including alternative data types. For example, and without limitation, the output signal may include an amount of voltage change based at least in part on the presence of infrared radiation in a field of view of an active infrared (AIR) sensor, the output signal may include phase shift data from a microwave-type radio frequency motion sensor, the output signal may include doppler shift data from an ultrasonic-type motion sensor, the output signal may include radio wave disturbance from a tomographic-type motion sensor, and/or the output signal may include other data types for other sensor types that may be used as the motion detector 502. In at least some examples, the motion detector 502 may include a radar sensor and/or PIR sensor 130. A radar sensor may include a transmitter, two or more receivers (e.g., with corresponding antennas), a mixer, an ADC, and/or other electronics configured to perform the various operations described herein. In various examples, circuitry may be included in the electronic device 501 and/or in the image signal processor 546 that may be effective to perform the various motion detection techniques described herein. In various examples, a PTR sensor, radar sensor, or other motion sensor may be used to perform coarse motion detection (e.g., in first operation mode 140a). Once the PIR sensor or other motion sensor is triggered, other motion sensing techniques (e.g., the motion detection techniques described above in reference to FIGS. 2A-2D) and/or CV-based object detection) may be triggered (e.g., in second operation mode 140b).

An imaging device 508 may include any device that includes an image sensor 544, such as a charge-coupled device (CCD) and/or an active-pixel sensor (CMOS sensor), that is capable of generating image data 526 (which may represent, and/or include, the frames of image data described herein), representing one or more images (e.g., a video). The imaging device 508 may include a lens 538 that is effective to focus light on the image sensor 544. The light may be filtered by an RGB color filter array (CFA) 540 (e.g., a Bayer CFA) or an RGB-IR CFA. In one aspect of the present disclosure, the image sensor 544 may comprise a complementary metal-oxide semiconductor (CMOS) array and may be capable of recording high definition (e.g., 722p, 1800p, 4K, 8K, etc.) image and/or video files. The image sensor 544 may comprise a plurality of photosensors that may transform light into electrical signals. Such electrical signals may be represented by numerical values (e.g., floating point numbers) that may be processed using the image signal processor 546. Each photosensor of the image sensor 544 corresponds to a pixel in a frame of image data captured by the image sensor. In other words, the light information captured by the image sensor is represented as pixel values (e.g., a respective pixel value captured by each photosensor/pixel of the image sensor). Accordingly, each pixel in a frame of image data typically corresponds to one photosensor and the pixels in a frame are likewise arranged in a grid. The pixel value of each pixel represents the light captured by the corresponding photosensor during image capture.

In some other examples, the image sensor may be coated with a dual band-pass filter that has a passband at about 900 nm to allow IR color reproduction during the day and also to allow IR light detection when the imaging device(s) 508 are in night mode. In some examples, the electronic device 501 may include an IR cut filter 542 to filter out infrared light from the light path of the photosensors when the electronic device 501 is configured in day mode. The IR cut filter 542 may be removed from the light path such that infrared light may reach the photosensors when the electronic device 501 is configured in night mode.

The imaging device 508 may include a separate image signal processor 546, or the processor(s) 503 may perform the camera processing functionality. The processor(s) 503 (and/or camera processor) may include an encoding and compression chip. In some embodiments, the processor(s) 503 (and/or the camera processor) may comprise a bridge processor. The processor(s) 503 (and/or the camera processor) may process video recorded by the image sensor and may transform this data into a form suitable for transfer by the network interface(s) 504. In various examples, the imaging device 508 also includes memory, such as volatile memory that may be used when data is being buffered or encoded by the processor(s) 503 (and/or the camera processor). For example, in certain embodiments the camera memory may comprise synchronous dynamic random-access memory (SD RAM).

The lighting device(s) 512 may be one or more light-emitting diodes capable of producing visible light and/or infrared light when supplied with power (e.g., to enable night vision). In some embodiments, when activated, the lighting device(s) 512 illuminates a light pipe. In some examples, the electronic device 501 uses the lighting device(s) 512 to illuminate specific components of the electronic device 501, such as the input device(s) 514. This way, users are able to easily see the components when proximate to the electronic device 501.

An input device 514 may include, but is not limited to, a button, a touch-sensitive surface, a switch, a slider, and/or any other type of device that allows a user to provide input to the electronic device 501. For example, if the electronic device 501 includes a doorbell, then the input device 514 may include a doorbell button. In some examples, based on receiving an input, the processor(s) 503 may receive a signal from the input device 514 and use the signal to determine that the input device 514 received the input. Additionally, the processor(s) 503 may generate input data representing the input received by the input device(s) 514. For example, the input data may represent the type of input (e.g., a push to a button), a time that the input occurred, and/or the like.

The power source(s) 516 may include one or more batteries that provide power to the electronic device 501. However, in other examples, the electronic device 501 may not include the power source(s) 516. In such examples, the electronic device 501 may be powered using a source of external AC (alternating-current) power, such as a household AC power supply (alternatively referred to herein as "AC mains" or "wall power"). The AC power may have a voltage in the range of 112-220 VAC, for example. The incoming AC power may be received by an AC/DC adapter (not shown), which may convert the incoming AC power to DC (direct-current) and may step down the voltage from 112-220 VAC to a lower output voltage of about 12 VDC and an output current of about 2 A, for example. In various embodiments, the output of the AC/DC adapter is in a range from about 9 V to about 15 V and in a range from about 0.5 A to about 5 A. These voltages and currents are examples provided for illustration and are not intended to be limiting. In some examples, the power source(s) 516 may include one or more solar photovoltaic cells for generating electrical energy from sunlight.

The speaker(s) 518 may be any electromechanical device capable of producing sound in response to an electrical signal input. The microphone(s) 520 may be an acoustic-to-electric transducer or sensor capable of converting sound waves into audio data 530 representing the sound. The speaker(s) 518 and/or microphone(s) 520 may be coupled to an audio CODEC to enable digital audio received by user devices to be decompressed and output by the speaker(s) 518 and/or to enable audio data captured by the microphone(s) 520 to be compressed into digital audio data 530. In some examples, the electronic device 501 includes the speaker(s) 518 and/or the microphone(s) 520 so that the user associated with the electronic device 501 can communicate with one or more other users located proximate to the electronic device 501. For example, the microphone(s) 520 may be used to generate audio data representing the speech of the one or more other users, which is then sent to the camera device. Additionally, the speaker(s) 518 may be configured to output user speech of the user, where the user's user speech may also be represented by audio data 530.

In some examples, the electronic device 501 determines that the start of the video is the first frame of the video. In some examples, the electronic device 501 may continuously generate image data (e.g., the electronic device 501 does not turn off the imaging device(s) 508). In other examples, such as when the electronic device 501 does not continuously generate the image data 526 (e.g., the electronic device 501 turns off the imaging device(s) 508 until detecting an event such as a motion event), the start of the video corresponds to the first frame of the video that is generated by the imaging device(s) 508.

As further illustrated in the example of FIG. 5, the electronic device 501 may include the computer-vision component 548. The computer-vision component 548 may be configured to analyze the image data 526 using one or more computer-vision techniques and output computer-vision data 550 based on the analysis. The computer-vision data 550 may represent information, such as the presence of an object represented by the image data 526, the type of object represented by the image data 526, locations of the object relative to the electronic device 501, a direction of movement of the object, a velocity of the object, and/or any other type of information. In various examples, an object detection may be an example of a type of micro-event and/or a video event. As described herein, the type of object may include, but is not limited to, a person, an animal (e.g., a dog, a cat, a bird, etc.), a car, a tree, a wall, and/or any other type of object. In some examples, the computer-vision data 550 may further represent a bounding box indicating the respective location of each object represented by the image data 526.

For example, the computer-vision component 548 may analyze the image data 526 using one or more computer-vision techniques such as, but not limited to, object detection technique(s), object tracking technique(s), semantic segmentation technique(s), instance segmentation technique(s), object co-segmentation techniques, and/or any other computer vision technique(s). Computer-vision analysis includes methods for acquiring, processing, analyzing, and understanding digital images, such as by extracting high-dimensional data from the real world in order to produce numerical or symbolic information. This information is then used to identify object(s) represented in the image, locations of the object(s), a respective velocity of each object, and/or the like.

For a first example of performing computer-vision analysis, the computer-vision component 548 may use image segmentation technique(s) that use the computer-vision analysis to locate objects and boundaries (e.g., lines, curves, etc.) in images. Image segmentation may further assign labels to the segments, where segments that include the same label also include the same characteristics. As described herein, the one or more image segmentation techniques may include, but are not limited to, clustering technique(s), compression-based technique(s), histogram-based technique(s), edge detection technique(s), dual clustering technique(s), multi-scale segmentation technique(s), and/or any other type of image segmentation technique that may be use to segment the frame(s) of the video. In various examples, computer vision component 548 may be used to evaluate cropped activity zones in which motion has been detected using the motion detection techniques described herein. In various examples, upon detecting an object of interest in the cropped activity zone, the electronic device may begin encoding and transmitting captured video to one or more remote devices.

Compression-based technique(s) attempts to find patterns in an image and any regularity in the image can then be compressed. The compression-based technique(s) describe each segment (e.g., portion) by its texture and boundary shape, where each component is modeled by a probability distribution function and its coding length. The goal of the compression-based technique(s) is to find the segmentation which produces the shortest coding length. This may be achieved by a simple agglomerative clustering method.

Histogram-based technique(s) compute a histogram from all of the pixels in the image, where the peaks and values in the histogram are used to locate the clusters (e.g., portions) in the image. In some instances, color and intensity can be used as the measure of the clusters. In some instances, the histogram-based technique(s) may recursively apply the histogram-seeking method to clusters in the image in order to divide the clusters into smaller clusters. This operation may be repeated until no more clusters are formed.

Edge detection technique(s) use region boundaries and edges that are closely related, since there is often a sharp adjustment in intensity at the region boundaries. As such, the edge detection technique(s) use the region boundaries to segment an image. In some instances, the edge detection technique(s) use image detectors to identify the region boundaries.

Dual clustering technique(s) uses a combination of three characteristics of an image: partition of the image based on histogram analysis is checked by high compactness of the clusters, and high gradients of their borders. The dual clustering technique(s) use two spaces, one space is a one-dimensional histogram of brightness and a second space is a dual three-dimensional space of the original image. The first space allows the dual clustering technique(s) to measure how compactly the brightness of the image is distributed by calculating a minimal clustering. The clustering technique(s) use the two spaces to identify objects within the image and segment the image using the objects.

For a second example of performing computer-vision analysis, the computer-vision component 548 may use object detection technique(s) that use computer-vision analysis to perform informative region selection, features extraction, and then classification of object(s) represented by the image data 526. Informative region selection may include selecting different portions (e.g., windows) of an image represented by the image data for analysis. Feature extraction may then include extracting visual features of the object(s) located within the portions of the image in order to provide a semantic and robust representation of the object(s). Finally, classification may include classifying the type(s) of object(s) based on the extracted features for the object(s). In some examples, the object detection technique(s) may include machine learning technique(s), such as a Viola-Jones object detection technique, a scale-invariant feature transform technique, a histogram of oriented gradients features technique, and/or the like. Additionally, and/or alternatively, in some examples, the object detection technique(s) may include deep learning approaches, such as region proposal technique(s) (e.g., CNN technique(s)), you only look once technique(s), deformable convolutional networks technique(s), ad/or the like.

The electronic device 501 may also store command data 556. In some circumstances, a user of the electronic device 501 may want to receive a live view from the electronic device 501. The command data 556 may represent an identifier associated with the electronic device 501, a command to generate the image data 526, a command to send the image data 526, and/or the like. In some examples, the electronic device 501 may then analyze the command data 556 and, based on the identifier, determine that the command data 556 is directed to the electronic device 501. For example, the electronic device 501 may match the identifier represented by the command data 556 to an identifier associated with, and stored by, the electronic device 501. Additionally, the electronic device 501 may cause the imaging device(s) 508 to begin generating the image data 526 (e.g., if the imaging device(s) 508 are not already generating the image data 526) and send the image data 526 to the one or more computing devices implementing the motion detector 502, the camera device, and/or another device.

As used herein, a processor may include multiple processors and/or a processor having multiple cores. Further, the processor(s) may comprise one or more cores of different types. For example, the processor(s) may include application processor units, graphic processing units, and so forth. In one instance, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the memory, or the same functionality may alternatively be implemented in hardware, firmware, application specific integrated circuits, field programmable gate arrays, or as a system on a chip (SoC). In addition, while not illustrated, the memory may include at least one operating system (OS) component that is configured to manage hardware resource devices such as the network interface(s), the I/O devices of the respective apparatuses, and so forth, and provide various services to applications or components executing on the processor(s). Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

Network interface(s) may enable data to be communicated between electronic devices. The network interface(s) may include one or more network interface controllers (NICs) or other types of transceiver devices to send and receive messages over network(s). For instance, the network interface(s) may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, the network interface(s) may include a wide area network (WAN) component to enable message over a wide area network.

Figure 6:
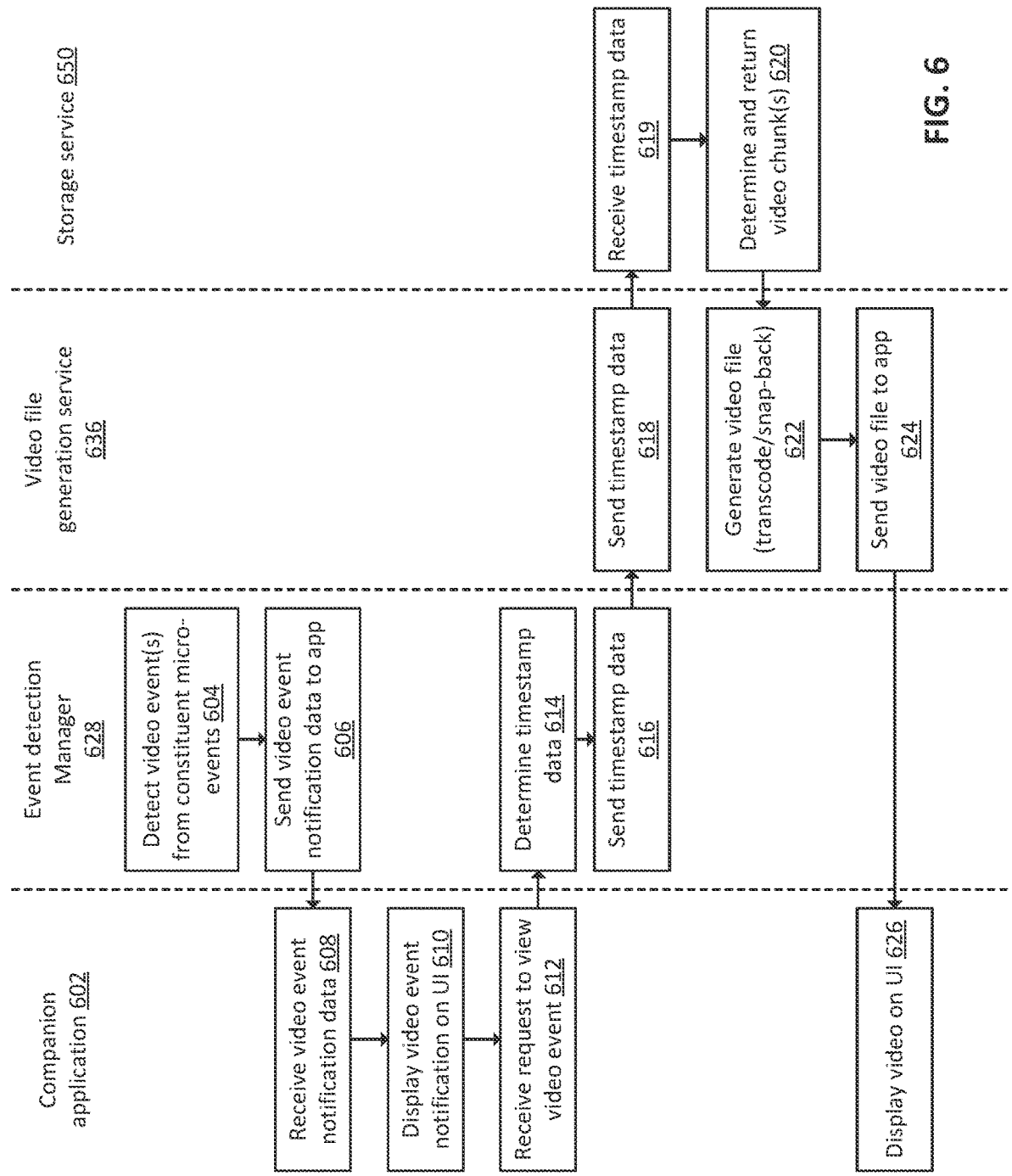
FIG. 6 depicts a timing diagram that may be used to provide on-demand video of a detected video event in a continuous recording architecture, in accordance with various aspects of the present disclosure.

FIG. 6 depicts a timing diagram that may be used to provide on-demand video of a detected video event in a continuous recording architecture, in accordance with various aspects of the present disclosure. The event detection manager 628 may detect video event(s) using the constituent micro-events (block 604). For example, the micro-events may be detected by the camera device 120 and sent to the event detection manager 628 or the micro-events may be detected from video data and/or other data sent to the event detection manager 628. In some examples, an end-session micro-event or other pre-defined micro-event may trigger the event detection manager 628 to evaluate the preceding micro-events to determine if a pre-defined video event is detected. If a video event is detected, the event detection manager 628 may send video event notification data to the companion application (block 606). At block 608, the companion application 602 may receive the video event notification data. Alternatively, the companion application 602 may display frames of the captured video and the user may select from among the frames to select a particular video event. At block 610, the companion application 602 may display the video event notification on a user interface. At block 612, a request to view the video event may be received on a user interface of the companion application 602.

At block 614, the event detection manager 628 may determine the timestamp data associated with the selected video event. The event detection manager 628 may send the timestamp data to the video file generation service 636 (block 616). Alternatively, the video file generation service 636 may already have the timestamp data for the selected video event and the selection of the video event may trigger the video file generation service to send the timestamp data to the storage service 650 (block 618). The storage service 650 may continuously receive chunks of video data for storage from the continuously-recording and streaming camera device 120. In various cases, a media server may first generate file data representing the chunks (e.g., mp4 files) prior to storage. The storage service 650 may receive the timestamp data (e.g., via an API call at block 619) and may determine and return the appropriate video chunk(s) implicated by the timestamp data (block 620). At block 622, the video file generation service 636 may generate a file including the frames of image data corresponding to the timestamp data received from the event detection manager 628. Additionally, the video file generation service 636 may include an I-frame that immediately precedes the start time of the timestamp data (to the extent the start time of the timestamp data does not already correspond to an I-frame of the video chunk). Alternatively, the video file generation service 636 may transcode an I-frame using the preceding I-frame of the video chunk and the inter-encoded frame implicated by the start time of the timestamp data. At block 624, the video file generation service 636 may send (e.g., stream) the video file to the companion application 602. At block 626, the companion application 602 may begin playback of the video file as it is received (e.g., using video streaming technology). Alternatively, the companion application 602 may download the video file prior to initiating playback.

Figure 7:
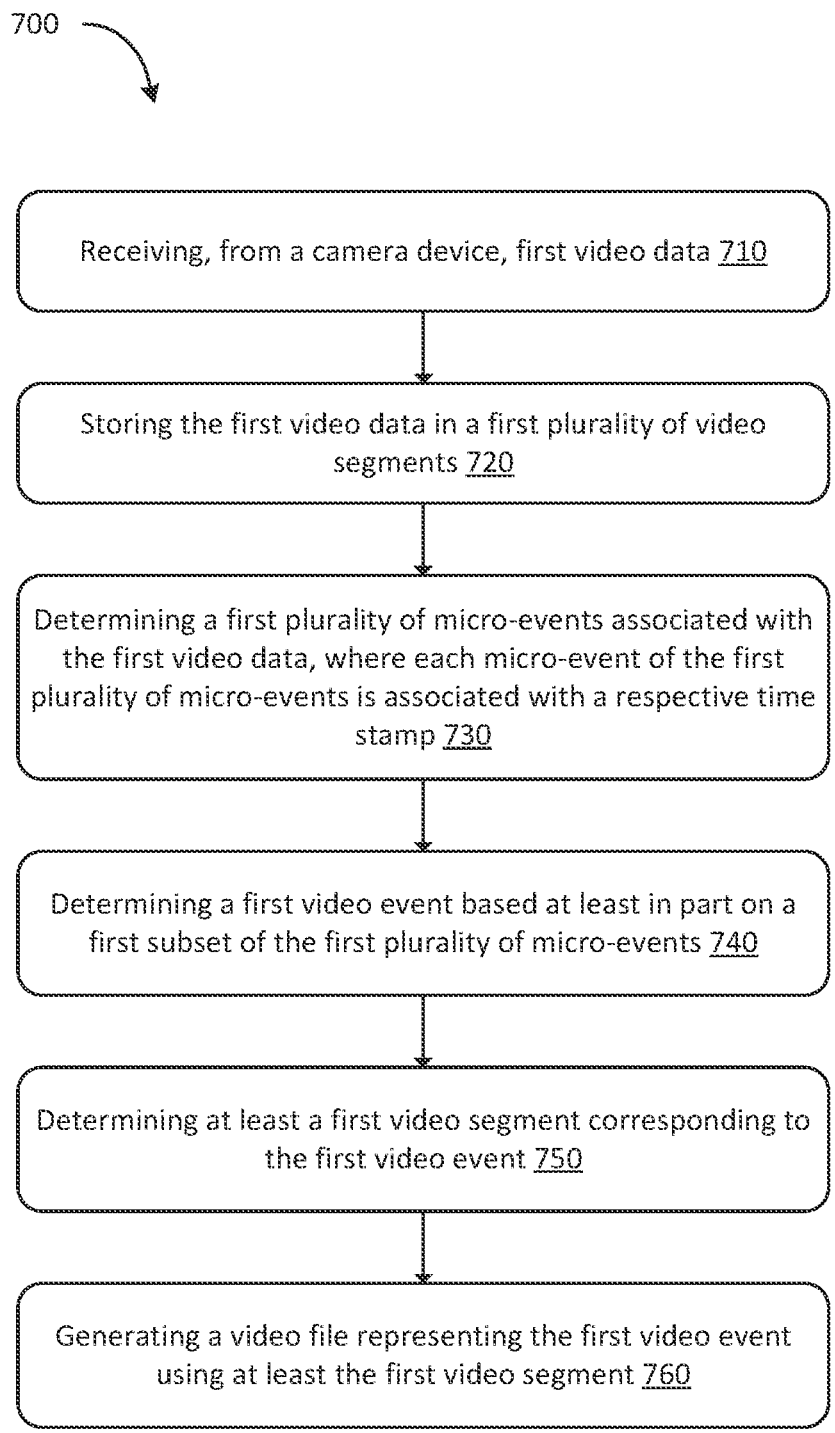
FIG. 7 depicts an example process that may be used for continuous video recording, storage, and on-demand event streaming, in accordance with various aspects of the present disclosure.

FIG. 7 depicts an example process 700 that may be used for continuous video recording, storage, and on-demand event streaming, in accordance with various aspects of the present disclosure. The actions of the process 700 may represent a series of instructions comprising computer readable machine code executable by a processing unit of computing device(s) 102 and/or camera device 120, although various operations may be implemented in hardware. In various examples, the computer readable machine codes may be comprised of instructions selected from a native instruction set of the processor(s) and/or an operating system of the computing device.

Process 700 may begin at action 710, at which first video data may be received from a camera device. The video data may be among a continuous stream of video data recorded by the camera device 120. Processing may continue at action 720, at which the first video data may be stored in a first plurality of video segments. For example, a storage service may store the first video data in a plurality of chunks (segments). The chunks may be of a static time length (to within a tolerance (e.g., 10%)) or of an equal file size (to within a tolerance (e.g., +/−100 kB).

Processing may continue at action 730, at which a first plurality of micro-events associated with the first video data may be determined. In various examples, each micro-event of the first plurality of micro-events may be associated with a respective time stamp. Micro-events may comprise motion detections, object detections (e.g., person detections), streaming actions (e.g., start/stop), button presses, etc. Processing may continue at action 740, at which a first video event may be determined based at least in part on a first subset of the first plurality of micro-events. For example, some of the detected micro-events may correspond to pre-defined micro-events for a given video event that is likely to be of interest to a user. The video events that are of interest to a user may optionally be defined using a companion application of the camera device 120. Notifications representing detected video events may be sent to a companion application of the camera device 120. Notifications may be described using text stating the type of video event (e.g., "Answered doorbell button press," "Person detected," etc.) and/or using thumbnails representative of some part of the video event. A user may optionally select a video event (e.g., by selecting the notification) in order to have a video file concisely representing the event prepared and/or played back. Upon selection of the video event, the timestamp data representing the video event may be sent by the event detection manager 128 to the video file generation service 136.

Processing may continue at action 750, at which at least a first video segment corresponding to the first video event may be determined. For example, the one or more chunks of continuously-recorded video data that are implicated by the timestamp data associated with the video event may be determined. For example, the event detection manager 128 and/or the video file generation service 136 may query the storage service 150 for video chunks corresponding to the timestamp data (as previously described). Processing may continue at action 760, at which a video file may be generated that represents the first video event using at least the first video segment. For example, the first video segment (e.g., the chunk(s) corresponding to the timestamp data for the video event) may be trimmed according to the timestamp data for the video event. Additionally, an I-frame may be transcoded at the start time of the timestamp data or the video file may be "snapped back" to the immediately preceding I-frame prior to the start time.

Figure 8:
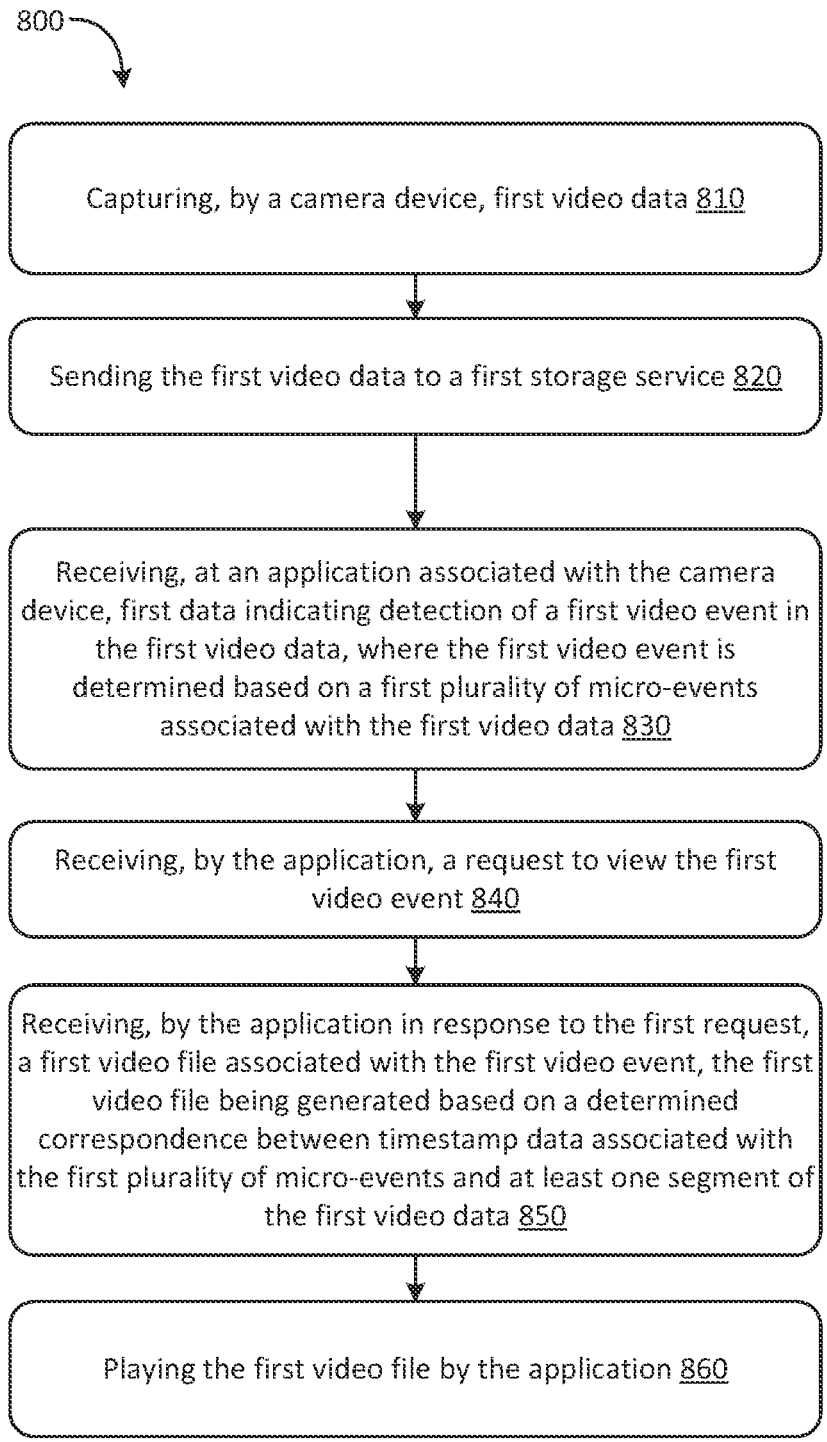
FIG. 8 depicts another example process that may be performed by a camera device and companion application for continuous video recording, storage, and on-demand event streaming, in accordance with various aspects of the present disclosure.

FIG. 8 depicts another example process 800 that may be performed by camera device 120 and a companion application for continuous video recording, storage, and on-demand event streaming, in accordance with various aspects of the present disclosure. The actions of the process 800 may represent a series of instructions comprising computer readable machine code executable by a processing unit of an image signal processor, although various operations may be implemented in hardware. In various examples, the computer readable machine codes may be comprised of instructions selected from a native instruction set of the processor(s) and/or an operating system of the computing device.

Process 800 may begin at action 810, at which first video data may be captured by the camera device 120. The video data may be among a continuous stream of video data recorded by the camera device 120. Processing may continue at action 820, at which the first video data may be sent, as a first plurality of video segments, to a first storage service. For example, a storage service may store the first video data in a plurality of chunks (segments). The chunks may be of a static time length (to within a tolerance (e.g., 10%)) or of an equal file size (to within a tolerance (e.g., +/−100 kB).

Processing may continue at action 830, at which an application associated with the camera device 120 may receive first data indicating a detection of a first video event in the first video data. The first video event may be determined based on a first plurality of micro-events associated with the first video data. For example, the event detection manager 128 may detect the first video event based on a pre-defined set of micro-events as previously described.

Processing may continue at action 840, at which the application may receive a request to view the first video event. For example, a user may select an on-screen notification indicating that an event has been detected and inviting the user to select an on-screen graphical control in order to view video of the detected event.

Processing may continue at action 850, at which the application may receive, in response to the first request, a first video file associated with the first video event may be received. The first video file may be generated based on a determined correspondence between timestamp data associated with the first plurality of micro-events and at least one segment (chunk) of the first video data. For example, the first video segment (e.g., the chunk(s) corresponding to the timestamp data for the video event and the first plurality of micro-events) may be trimmed according to the timestamp data for the video event. Additionally, an I-frame may be transcoded at the start time of the timestamp data or the video file may be "snapped back" to the immediately preceding I-frame prior to the start time.

Processing may continue at action 860, at which the first video file may be played back by the application. The video file may be streamed to the application and played back in real time or the application may download all or a portion of the first video file prior to playback.

In accordance with one or more implementations, motion or activity that would potentially trigger an alert or notification but for user configuration settings may cause a camera device to send data indicating potential motion detection or activity to a remote system. Based on this data, the remote system may subsequently send data indicating the potential motion detection or activity to an application loaded on a user device, which may display an indication of such potential motion detection or activity, e.g. using a visual indicator displayed on a timeline view. For example, in accordance with one or more implementations a user may configure a camera device to utilize one or more motion zones or one or more radar zones, and motion detection that is outside of configured zones may nonetheless trigger a message indicating potential motion detection or activity.

In accordance with one or more implementations, a user is able to set up custom motion or intrusion zones, and/or custom radar zones, such as disclosed, for example, in U.S. patent application Ser. No. 17/951,749. This patent application, as well as any patent application publications thereof (including USPA Pub. No. [to be inserted upon publication]) and any patents issuing therefrom (including U.S. Pat. No. [to be inserted upon issuance]) are hereby incorporated herein by reference.

In accordance with one or more implementations, motion or activity that would potentially trigger an alert or notification but for user configuration settings may cause a system to send data indicating potential motion detection or activity to a user device (e.g. to an application loaded on a user device). The user device may display an indication of such potential motion detection or activity, e.g. using a visual indicator displayed on a timeline view. For example, in accordance with one or more implementations a user may configure object detection settings for a camera device that are utilized for object detection at the camera device or at a remote system, and detections that do not fall within those settings (e.g. detections for classes of objects other than selected classes) may nonetheless trigger a message indicating potential motion detection or activity. For example, a user may configure detection of people, vehicles, and packages, but detection of motion or an object that is not classified as being in one of these classes may nonetheless trigger a message indicating potential motion detection or activity.

As set forth above, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items may be stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be sent as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. The various features and processes described above may be used independently of one another, or may be combined in various ways. All possible combinations and subcombinations are intended to fall within the scope of this disclosure.

In addition, conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Although this disclosure has been described in terms of certain example embodiments and applications, other embodiments and applications that are apparent to those of ordinary skill in the art, including embodiments and applications that do not provide all of the benefits described herein, are also within the scope of this disclosure. The scope of the inventions is defined only by the claims, which are intended to be construed without reference to any definitions that may be explicitly or implicitly included in any incorporated-by-reference materials.

What is claimed is:

1. A method comprising:
   storing first video data generated by a camera device as a plurality of predefined chunks, each predefined chunk comprising a plurality of intra-coded frames and a plurality of inter-coded frames;
   storing event data associated with the camera device, the event data indicating a first time associated with a first event;
   receiving, from an application loaded on a user device, a request to view video for the first event;
   based on the receiving of the request,
      determining, based on the first time associated with the first event and the first video data, a first intra-coded frame of the first video data that is a last frame of a first type prior to the first time, the first intra-coded frame being associated with a second time,
      based on the determining that the first intra-coded frame is a last intra-coded frame prior to the first time associated with the first event, storing the second time as a start time for the first event,
      determining a first predefined chunk of the plurality of predefined chunks that corresponds to the second time, and
      sending the first predefined chunk and data representing the second time to the application loaded on the user device.

2. The method of claim 1, wherein the method comprises
   receiving the first video data generated by the camera device;
   determining that a video length for a first portion of the first video data exceeds a first threshold;
   based on the determining that a video length for the first portion of the first video data exceeds the first threshold, determining a second intra-coded frame proximate a boundary of the first portion of the first video data; and
   based on the determining of the second intra-coded frame,
      storing video data for a first plurality of frames prior to the first intra-coded frame as a first new chunk, and
      storing video data for a second plurality of frames including and subsequent to the first intra-coded frame as a second new chunk.

3. The method of claim 1, wherein the method comprises
   receiving the first video data generated by the camera device;
   determining that a file size of a first portion of the first video data exceeds a first threshold;
   based on the determining that a file size of the first portion of the first video data exceeds the first threshold, determining a second intra-coded frame proximate a boundary of the first portion of the first video data; and
   based on the determining of the second intra-coded frame,
      storing video data for a first plurality of frames prior to the first intra-coded frame as a first new chunk, and
      storing video data for a second plurality of frames including and subsequent to the first intra-coded frame as a second new chunk.

4. A method comprising:
   storing first video data generated by a camera device, the first video data comprising a plurality of frames;
   storing event data associated with the camera device, the event data indicating a first time associated with a first event;
   determining, based on the first time associated with the first event and the first video data, a first frame of the plurality of frames that is a frame of a first type and that corresponds to a second time proximate to the first time;

based on the determining of the first frame, storing the second time as a start time for the first event;

determining a predefined chunk of the first video data associated with the second time; and sending the predefined chunk of video and data representing the second time to a user device.

5. The method of claim 4, wherein storing the first video data comprises storing the first video data as a plurality of chunks.

6. The method of claim 5, wherein each chunk comprises a plurality of frames of the first type.

7. The method of claim 4, wherein the method comprises receiving a message from an application loaded on a user device, and wherein the determining of the first frame is based on the receiving of the message from the application loaded on the user device.

8. The method of claim 7, wherein the method comprises sending, to the application loaded on the user device, a portion of the first video data associated with the second time.

9. The method of claim 7, wherein each frame of the plurality of frames comprises two fields.

10. The method of claim 4, wherein each frame of the first type is an intra-coded frame.

11. The method of claim 4, wherein each frame of the first type is a key frame.

12. The method of claim 4, wherein each frame of the first type is an instantaneous decoder refresh frame.

13. The method of claim 4, wherein each frame of the first type is a clean random access frame.

14. The method of claim 4, wherein each frame of the first type is a random access picture.

15. The method of claim 4, wherein the determining of the first frame involves determining that the first frame is a last frame of the first type prior to the first time.

16. The method of claim 4, wherein the method comprises generating a video file based on the second time, and sending the video file to an application loaded on the user device.

17. The method of claim 4, wherein the method comprises sending data indicating the second time to an application loaded on the user device.

18. A method comprising:

storing first video data generated by a camera device;

storing event data associated with the camera device, the event data indicating a first time associated with a first event;

receiving, from an application loaded on a user device, a request to view video for the first event; and based on the receiving of the request, determining, based on the first time associated with the first event and the first video data, a first frame of the first video data that corresponds to the first time, the first frame being an inter-coded frame, generating, based on the first video data, second video data representing an intra-coded version of the first frame, generating, based on the first video data and the second video data, third video data representing a version of the first video data with the first frame of the first video data replaced by the intra-coded version of the first frame, and sending the third video data to the application loaded on the user device.

19. The method of claim 18, wherein the storing of the first video data comprises storing the first video data as a plurality of chunks.

20. The method of claim 18, wherein generating the intra-coded version of the first frame comprises generating an instantaneous decoder refresh frame.

21. The method of claim 18, wherein the method comprises determining, based on the first time associated with the first event and the first video data, that there is no intra-coded frame of the first video data within a threshold amount of time prior to the first time, and wherein the generating of the second video data representing an intra-coded version of the first frame is based on the determining that there is no intra-coded frame of the first video data within the threshold amount of time prior to the first time.

22. The method of claim 18, wherein the method comprises determining, based on the first time associated with the first event and the first video data, that there is no intra-coded frame of the first video data within a first threshold amount of time prior to the first time, and determining, based on the first time associated with the first event and the first video data, that there is no intra-coded frame of the first video data within a second threshold amount of time subsequent to the first time, and wherein the generating of the second video data representing an intra-coded version of the first frame is based on the determining that there is no intra-coded frame of the first video data within the first threshold amount of time prior to the first time and the determining that there is no intra-coded frame of the first video data within the second threshold amount of time subsequent to the first time.

23. A method comprising:

receiving first video data generated by a camera device, the first video data comprising a plurality of intra-coded frames and a plurality of inter-coded frames;

determining that a file size of a first portion of the first video data exceeds a first threshold;

based on the determining that a file size of the first portion of the first video data exceeds the first threshold, determining a first intra-coded frame proximate a boundary of the first portion of the first video data; and based on the determining of the first intra-coded frame, storing video data for a first plurality of frames prior to the first intra-coded frame as a first chunk, and storing video data for a second plurality of frames including and subsequent to the first intra-coded frame as a second chunk.

24. The method of claim 23, wherein the storing of the video data for the second plurality of frames is also based on determining that a file size of a second portion of the video data exceeds the first threshold and based on determining a first intra-coded frame proximate a boundary of the second portion of the video data.

25. The method of claim 23, wherein the first intra-coded frame is an instantaneous decoder refresh frame.

26. The method of claim 23, wherein the first intra-coded frame is a key frame.

* * * * *